（12) United States Patent
Schneider et al.

(10) Patent No.: US 11,048,722 B2
(45) Date of Patent: Jun. 29, 2021

(54) PERFORMANCE OPTIMIZATION FOR DATA PERSISTENCY IN ASYNCHRONOUS REPLICATION SETUPS

(71) Applicant: EMC IP Holding Company LLC, Hopkinton, MA (US)

(72) Inventors: Zvi Schneider, Tel Aviv (IL); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 340 days.

(21) Appl. No.: 16/050,247

(22) Filed: Jul. 31, 2018

(65) Prior Publication Data

US 2020/0042633 A1 Feb. 6, 2020

(51) Int. Cl.
*G06F 16/27* (2019.01)
*G06F 12/0868* (2016.01)

(52) U.S. Cl.
CPC ........ *G06F 16/273* (2019.01); *G06F 12/0868* (2013.01); *G06F 2212/1032* (2013.01); *G06F 2212/281* (2013.01); *G06F 2212/45* (2013.01)

(58) Field of Classification Search
CPC .......................... G06F 16/273; G06F 12/0868
See application file for complete search history.

(56) References Cited

U.S. PATENT DOCUMENTS

| | | | |
|---|---|---|---|
| 6,202,085 B1 * | 3/2001 | Benson | G06F 16/2308 707/E17.007 |
| 6,496,908 B1 | 12/2002 | Kamvysselis et al. | |
| 6,553,464 B1 | 4/2003 | Kamvysselis et al. | |
| 6,564,219 B1 * | 5/2003 | Lee | G06F 16/25 707/769 |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |

(Continued)

OTHER PUBLICATIONS

U.S. Appl. No. 16/177,782, filed Nov. 1, 2018, Hu et al.

(Continued)

*Primary Examiner* — Ashish Thomas
*Assistant Examiner* — Jedidiah P Ferrer
(74) *Attorney, Agent, or Firm* — Daly, Crowley Mofford & Durkee, LLP

(57) ABSTRACT

In one aspect, performance optimization for data persistency in asynchronous replication setups includes creating at a source site of a data replication system, a snapshot (snapshot N) of input/output (IO) requests as part of a replication cycle, computing a delta of snapshot N and a previously created snapshot (snapshot N−1), and transmitting the delta to a target site of the data replication storage system. An aspect further includes storing, at the target site, snapshot N−1 during transmission of the delta, and caching the delta to a non-persistent storage device. Upon determining an occurrence of a loss event at the target site, a further aspect includes transmitting, by the target site, a request to retransmit the delta, retransmitting, by the source site, the delta to the target site, caching the delta to the non-persistent storage device until successful transmission of the delta, and committing the transmitted delta to permanent storage.

14 Claims, 7 Drawing Sheets

(56) References Cited

U.S. PATENT DOCUMENTS

| | | |
|---|---|---|
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 2004/0030837 A1* | 2/2004 | Geiner ............... G06F 11/2064 711/133 |
| 2004/0083263 A1* | 4/2004 | Richardson ........... H04L 63/123 709/204 |
| 2005/0044088 A1* | 2/2005 | Lindsay ............... G06F 16/273 707/999.1 |
| 2005/0193245 A1* | 9/2005 | Hayden ............... G06F 11/2069 714/13 |
| 2010/0057789 A1* | 3/2010 | Kawaguchi ......... G06F 11/2082 707/E17.005 |
| 2015/0019812 A1* | 1/2015 | Ban ..................... G06F 16/273 711/122 |

OTHER PUBLICATIONS

U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.

* cited by examiner

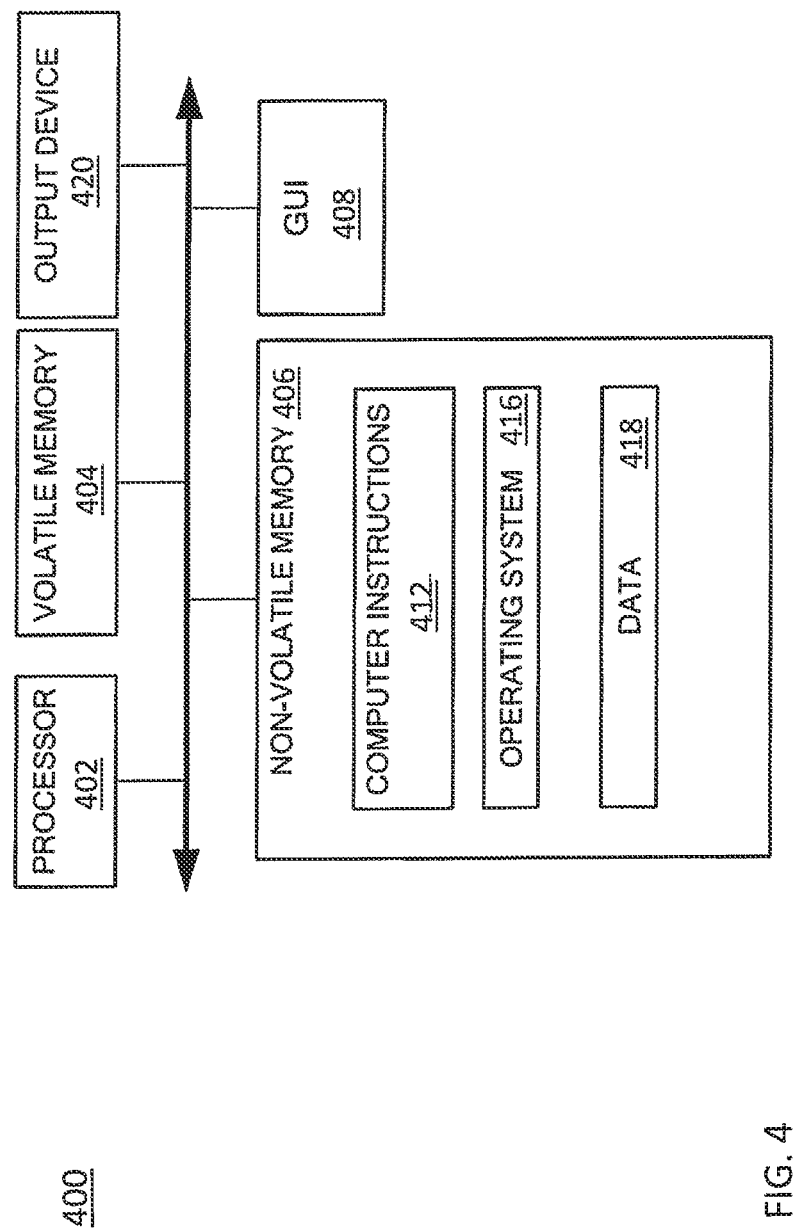

US 11,048,722 B2

PERFORMANCE OPTIMIZATION FOR DATA PERSISTENCY IN ASYNCHRONOUS REPLICATION SETUPS

BACKGROUND

Computer data is increasingly vital to modern organizations; therefore, protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis there may be several hours of lost data in the event of a disaster. Third, the data recovery process itself is time consuming as well as system resource consuming.

Some data protection systems use data replication by creating a copy of the organization's production site data on a secondary backup storage system and updating the backup with changes. During asynchronous replication, traditional methods persist cache data on a target site for every write operation, e.g., by journaling the data to another cache in a different server or writing it to disk. This limits performance capabilities on the target site in terms of memory use and speed.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performance optimization for data persistency in asynchronous replication setups. The method includes creating at a source site of a data replication system, a snapshot (snapshot N) of input/output (IO) requests as part of a replication cycle, computing a delta of snapshot N and a previously created snapshot (snapshot N−1), and transmitting the delta to a target site of the data replication storage system. The method further includes storing, at the target site, snapshot N−1 during transmission of the delta, and caching the delta to a non-persistent storage device. Upon determining an occurrence of a loss event at the target site, the method includes transmitting, by the target site, a request to retransmit the delta, retransmitting, by the source site, the delta to the target site, caching the delta to the non-persistent storage device until successful transmission of the delta, and committing the transmitted delta to permanent storage.

Another aspect may provide a system for performance optimization for data persistency in asynchronous replication setups. The system includes a memory having computer-executable instructions. The system also includes a processor operated by a storage system. The processor executes the computer-executable instructions. When executed by the processor, the computer-executable instructions cause the processor to perform operations. The operations include creating at a source site of a data replication system, a snapshot (snapshot N) of input/output (IO) requests as part of a replication cycle, computing a delta of snapshot N and a previously created snapshot (snapshot N−1), and transmitting the delta to a target site of the data replication storage system. The operations further include storing, at the target site, snapshot N−1 during transmission of the delta, and caching the delta to a non-persistent storage device. Upon determining an occurrence of a loss event at the target site, the operations include transmitting, by the target site, a request to retransmit the delta, retransmitting, by the source site, the delta to the target site, caching the delta to the non-persistent storage device until successful transmission of the delta, and committing the transmitted delta to permanent storage.

Another aspect may provide a computer program product embodied on a non-transitory computer readable medium. The computer program product includes instructions that, when executed by a computer at a storage system, causes the computer to perform operations. The operations include creating at a source site of a data replication system, a snapshot (N) of input/output (IO) requests as part of a replication cycle, computing a delta of snapshot N and a previously created snapshot (snapshot N−1), and transmitting the delta to a target site of the data replication storage system. The operations further include storing, at the target site, snapshot N−1 during transmission of the delta, and caching the delta to a non-persistent storage device. Upon determining an occurrence of a loss event at the target site, the operations include transmitting, by the target site, a request to retransmit the delta, retransmitting, by the source site, the delta to the target site, caching the delta to the non-persistent storage device until successful transmission of the delta, and committing the transmitted delta to permanent storage.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 4 is a block diagram of a hardware device that may perform at least a portion of the process shown in FIGS. 3A-3C.

DETAILED DESCRIPTION

Embodiments described herein provide a way to optimize performance for data persistency in asynchronous replication setups for a storage system having a source site (production site) and a target site (back up storage site). The performance optimization techniques record data in a non-persistent storage location such that an entire dataset is received at the target, completed, and destaged to a disk without being persisted in memory. In the event of cache data, loss, the cycle can be retransmitted.

Figure 1:
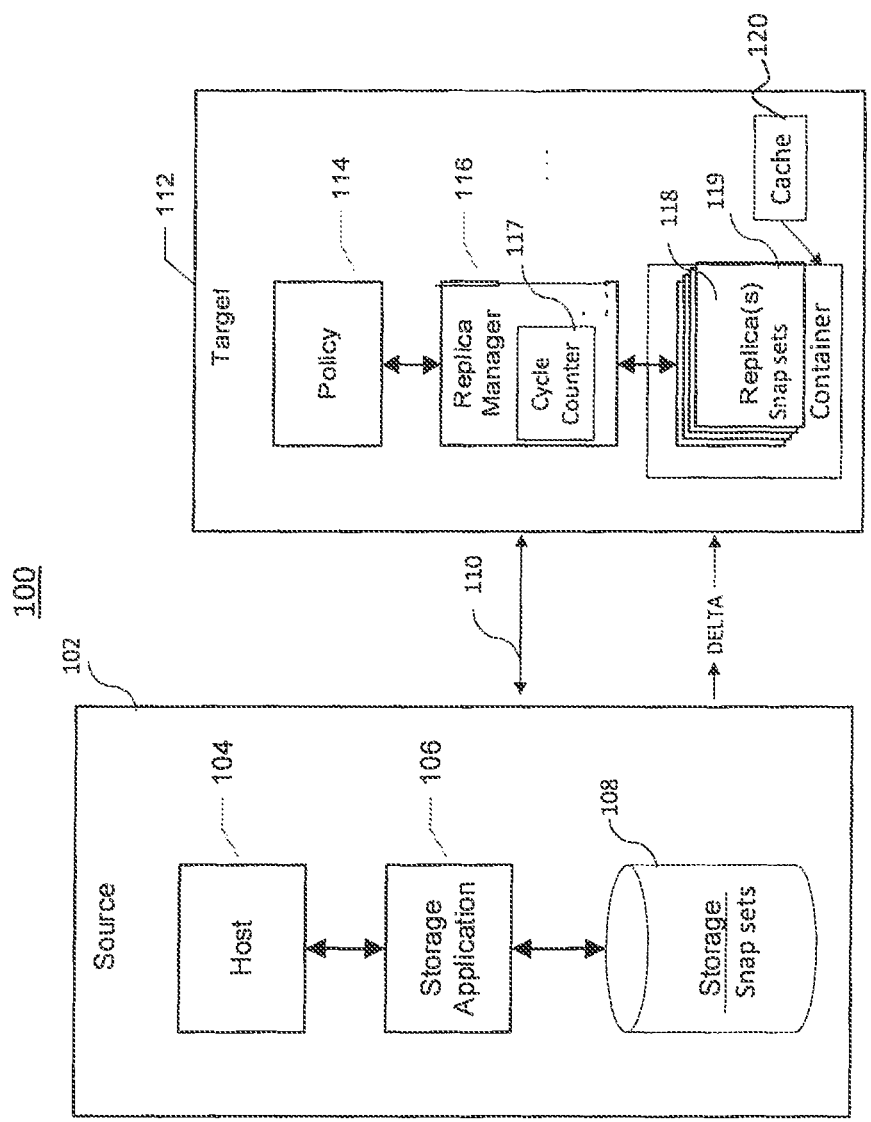
FIG. 1 is a block diagram of a storage system to perform performance optimization techniques for data persistency in accordance with an illustrative embodiment.

Turning now to FIG. 1, an example storage system 100 for implementing the performance optimization techniques will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, storage application 106, and data storage 108. In some embodiments, storage 108 may include one or more storage volumes (not shown), that operate as active or production volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110. In some embodiments, the communication network 110 may include internal (e.g., short distance) communication links (not shown) to transfer data between storage volumes for storing replicas 107 and 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle by data replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations.

In addition to managing replicas 118 according to a policy 114 (e.g., a replication and/or retention policy), the replica manager 116 may also include a cycle counter 117 to track generations of snap sets over time, as will be described further herein.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site.

In embodiments, a cache storage 120 is retained in storage container 119 on the target site. The cache storage 120 is described further in FIG. 2. The target site receives data transmissions from the source site, and during the transmission stores the data in the cache 120 without persistence. These features are described further herein.

Figure 2:
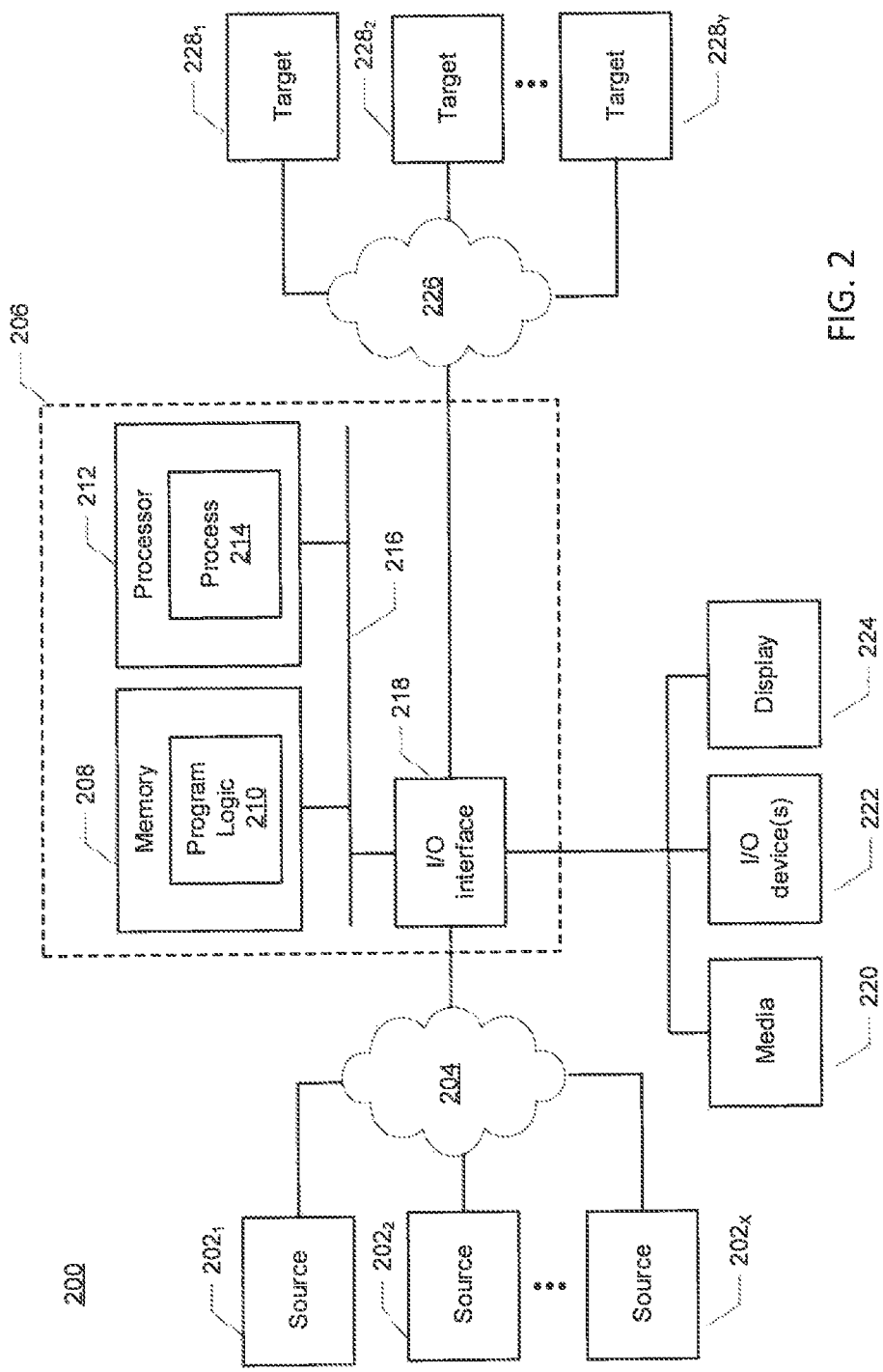
FIG. 2 is a block diagram of another storage system to perform performance optimization techniques for data persistency in accordance with an illustrative embodiment.

Referring to FIG. 2, in an illustrative embodiment, an apparatus 206 may form part of system 200 and include a memory 208 storing program logic 210, a processor (e.g., CPU) 212 for executing a process 214, and a communications I/O interface 218, connected via a bus 216 to allow communication between memory 208, processor 212 and devices external to apparatus 206. The memory 208 may include volatile and non-volatile memory. For example, the volatile memory may include a non-persistent cache memory for the CPU of the target system, and the non-volatile memory may include, e.g., read-only memory, flash memory, ferroelectric RAM, magnetic tape storage devices, such as hard disk drives, solid state drives, floppy disks, and magnetic tape, as well as optical discs. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an InfiniBand (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3A:
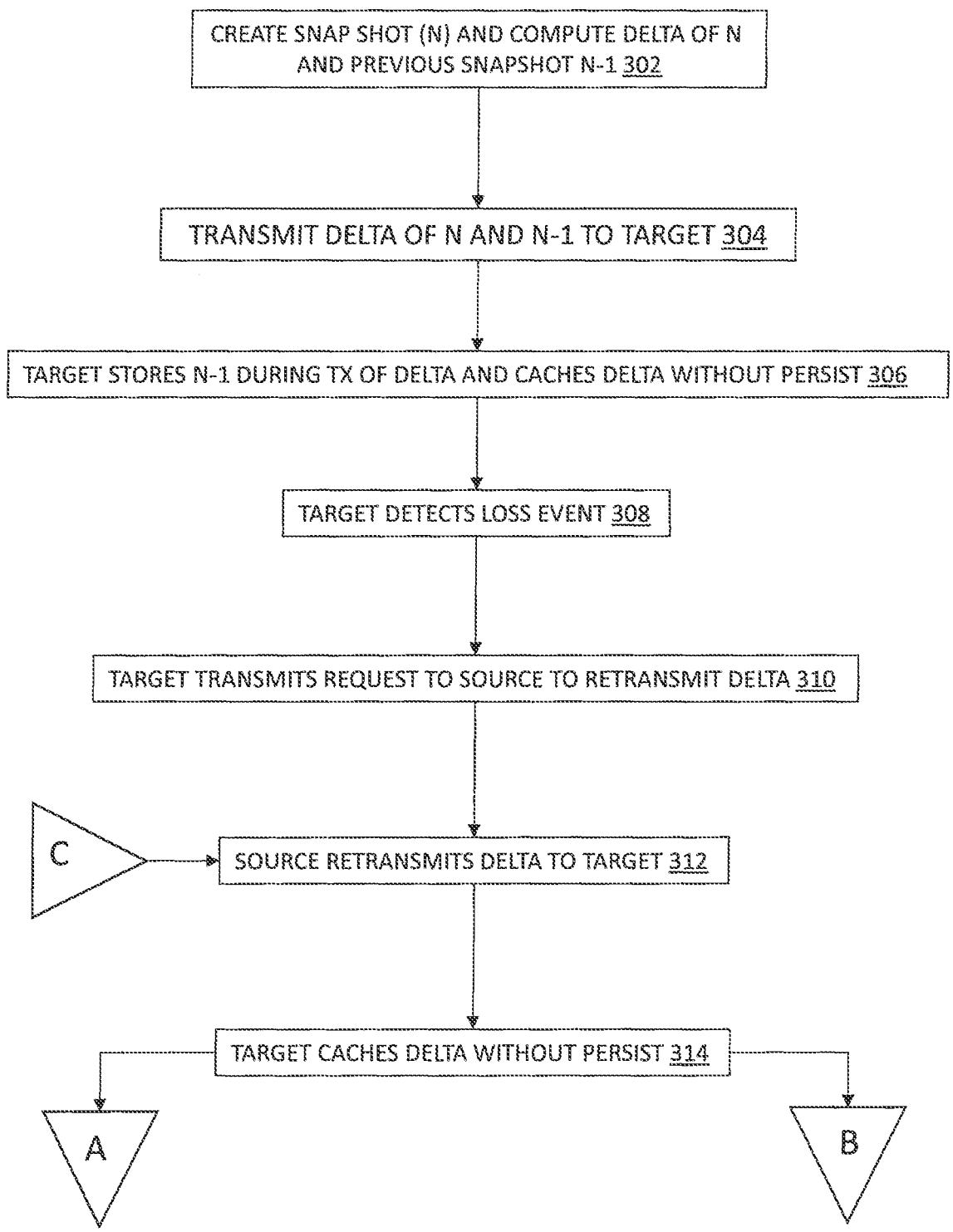
FIGS. 3A-3C are flow diagrams of processes to perform performance optimization techniques for data persistency in accordance with an illustrative embodiment.

Turning now to FIG. 3, a process 300 for implementing the performance optimization techniques will now be described in accordance with illustrative embodiments. The process 300 may be implemented, e.g., by the storage application 106 of FIG. 1. In the process of FIG. 3, a source system refers to a source site (e.g., site 102 of FIG. 1) or a source device 202 of FIG. 2. A target system refers to a target site 112 of FIG. 1 or one of target devices 228 of FIG. 2.

In block 302, the process 300 creates a snapshot (snapshot N), via the source site, for a current replication cycle and computes the delta of snapshot N from the previously created snapshot (snapshot N−1). The delta of snapshot N and snapshot N−1 reflects the corresponding replication cycle (cycle N). The process 300 assumes that the target has already received and committed the previous snapshot to storage.

In block 304, the source site transmits the delta of snapshots N and N−1 to the target site. In block 306, the target site, during the transmission of the delta from source to target, caches the delta in cache 120 without persistence.

In block 308, the target detects a loss event (e.g., a high availability (HA) event). In this event, the cached data may be comprised or lost altogether. The target transmits a request to the source site to retransmit the delta in block 310, and the source site retransmits the data (delta) to the target in block 312. The target caches the retransmitted delta in cache 120 without persistence. The process continues to process 300B in FIG. 3B as one embodiment or continues to process 300C in FIG. 3C as an alternative embodiment.

Figure 3B:
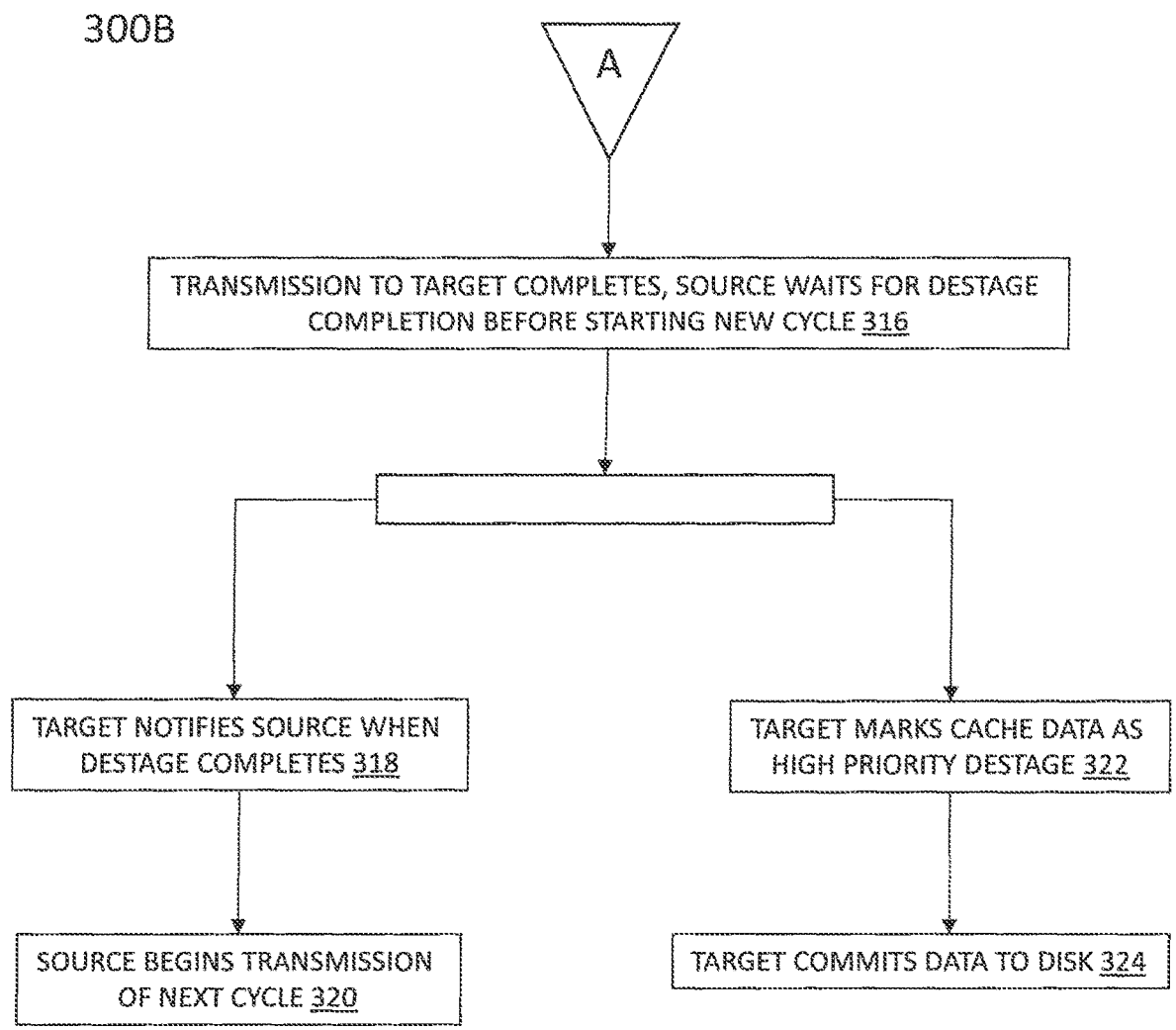

Turning to the embodiment of FIG. 3B, the transmission of the delta from the source to the target completes, and the source site waits for destage completion before beginning a new/next cycle (e.g., creating a next snapshot (snapshot N+1), computing a delta of snapshots N and N+1, and transmitting this delta to the target) in block 316. The next cycle is referred to as cycle N+1.

In block 318, the target site notifies the source site when the destage has completed. The destage completes when the data has been committed from the cache 120 to a permanent storage location. Note that the process 300B splits after block 316 indicating that one or more of the blocks following thereafter may be performed in parallel.

In block 320, the source begins transmission of the next cycle N+1 (e.g., the delta of snapshots N and N+1) to the target site.

In block 322, the target site marks the cache data in cache 120 as high priority destage. Generally, cache is destaged to disk as a background process, where there is no entity waiting for the destage to complete. For example, a host write that was stored in cache and is persisted is acknowledged to the host without the data destaged to disk. The destage can happen minutes, hours, or even days later. The destage process can destage in any order (e.g., to optimize disk usage or memory usage). A high-priority destage marks specific cache data to be destaged as soon as possible (within seconds), bypassing the destage process optimization algorithms. High priority destage is used when there is an entity waiting for the destage to complete.

In block 324, the target site commits the data from the cache 120 to disk (i.e., permanent storage).

Figure 3C:
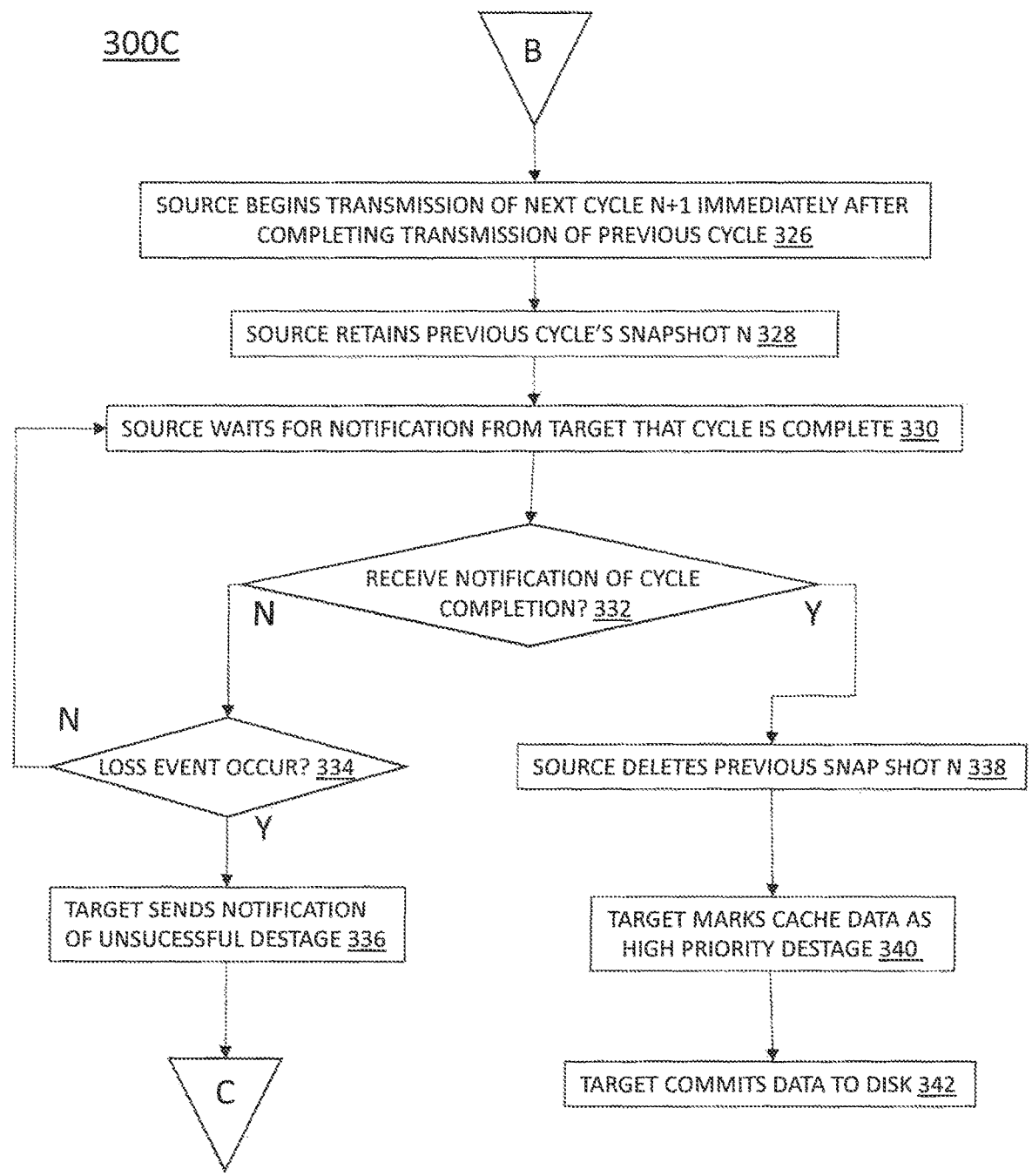

In an alternative embodiment, turning to the process 300C of FIG. 3C, the source site begins transmission of the next cycle (cycle N+1) (e.g., creating a next snapshot N+1, computing the delta of snapshots N and N+1, and transmitting this delta to the target site) in block 326. In block 328, the source site retains the previous cycle's (cycle N's) snapshot. In block 330, the source site waits for notification from the target site that the cycle has completed (e.g., the entire transmission from the source to the target is received at the target site).

In block 330, the process 300C determines whether the source site has received the notification of cycle completion from the target site. If not, the process 300C determines whether a loss event has occurred in block 334. If not, the process 300C assumes that the transmission is ongoing and returns to block 330. Otherwise, if a loss event has occurred, the target site sends notification to the source site that the transmission was unsuccessful or the destage was unsuccessful in block 336, and process 300C returns to block 312 of process 300A in FIG. 3A whereby the source site retransmits the data to the target site.

Returning to block 332, if the source site has received notification from the target site that the transmission is complete, the source site deletes the previous snapshot (snapshot N−1) in block 338. The target site marks the cache data as high priority destage in block 340, and the target site commits the data to disk in block 342. Thus, during cycle transmission between source and target, the data is not persisted in memory of the target site thereby saving bandwidth and memory.

Referring to FIG. 4, in some embodiments, the source site 102 and/or target site 112 may be implemented as one or more computers. Computer 400 may include processor 402, volatile memory 404 (e.g., RAM), non-volatile memory 406 (e.g., a hard disk drive, solid state drive such as a flash drive, a hybrid magnetic and solid state drive, etc.), graphical user interface (GUI) 408 (e.g., a mouse, a keyboard, a display, and so forth) and input/output (I/O) device 420. Non-volatile memory 406 stores computer instructions 412, an operating system 416 and data 418 such that, for example, the computer instructions 412 are executed by the processor 402 out of volatile memory 404 to perform at least a portion of the processes 300 shown in FIGS. 3A-3C (collectively referred to as FIG. 3). Program code may be applied to data entered using an input device of GUI 408 or received from I/O device 420.

Processes shown in FIG. 3 are not limited to use with the hardware and software of FIG. 4 and may find applicability in any computing or processing environment and with any type of machine or set of machines that is capable of running a computer program. Processes of FIG. 3 may be implemented in hardware, software, or a combination of the two.

The processes described herein are not limited to the specific embodiments described. For example, the processes are not limited to the specific processing order shown in FIG. 3. Rather, one or more blocks of processes may be re-ordered, combined or removed, performed in parallel or in serial, as necessary, to achieve the results set forth herein.

Processor 402 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIG. 3, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 5:
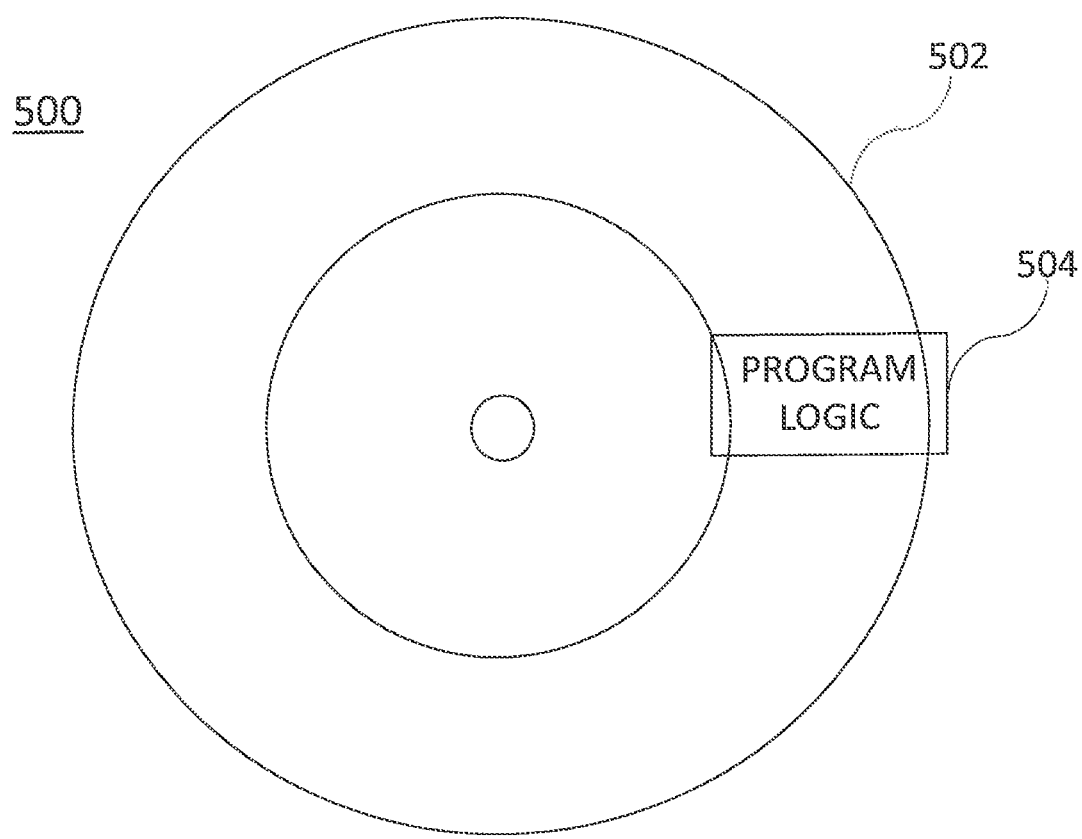
FIG. 5 a simplified block diagram of an apparatus that may be used to implement at least a portion of the systems of FIGS. 1-2 and 4 and at least a portion of the processes of FIGS. 3A-3C.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 5 shows Program Logic 504 embodied on a computer-readable medium 502 as shown, and wherein the Logic is encoded in computer-executable code configured for carrying out the reservation service process of this invention and thereby forming a Computer Program Product 500. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method, comprising:
   creating, at a source site of a data replication storage system, a snapshot (snapshot N) of input/output (IO) requests as part of a replication cycle;
   computing a delta of snapshot N and a previously created snapshot (snapshot N−1), the delta indicating a cycle N;
   transmitting, by the source site, the delta of snapshot N and snapshot N−1 to a target site of the data replication storage system;
   storing, at the target site, snapshot N−1 during transmission of the delta, and caching the delta to a non-persistent storage device;
   upon determining an occurrence of a loss event at the target site, transmitting, by the target site to the source site, a request to retransmit the delta;
   upon receiving the request from the target site to retransmit the delta, retransmitting, by the source site, the delta to the target site;
   caching the delta to the non-persistent storage device until successful transmission of the delta;
   committing the transmitted delta to permanent storage;
   creating a next snapshot (snapshot N+1) for a next cycle (cycle N+1);
   computing a delta between the snapshot N and the snapshot N+1, the delta of snapshot N and snapshot N+1 indicating the cycle N+1; and
   transmitting the delta of snapshot N and snapshot N+1 to the target site;
   wherein committing the delta to the permanent storage device comprises:
      beginning transmission, by the source site, of cycle N+1 immediately after completing transmission of cycle N;
      retaining, at the source site, snapshot N;
      waiting, at the source site, for a notification from the target site that the next cycle N+1 is complete;
      upon determining no notification has been received, determining whether a loss event has occurred at the target site;
      if no loss event has occurred, waiting by the source site for the notification;
      if a loss event has occurred, sending by the target site, a notification to the source site that a destage operation was unsuccessful;
      retransmitting, by the source site to the target site upon receiving the notification, the delta of snapshot N and snapshot N+1; and
      storing, by the target site, the retransmitted delta of snapshot N and snapshot N+1 to the non-persistent storage device.

2. The method of claim 1, wherein committing the delta to the permanent storage device comprises:
   waiting, at the source site, for confirmation from the target site that a destage operation of the transmitted delta has completed;
   upon completion of the destage operation, transmitting by the target site to the source site, notification that the destage operation has completed; and
   upon receiving the notification of completed destage operation, beginning transmission of the next cycle (cycle N+1) by the source site to the target site.

3. The method of claim 2, further comprising marking, by the target site, the cache data as high priority destage, wherein committing the transmitted to permanent storage includes committing, by the target site, the cache data to disk.

4. The method of claim 1, further comprising:
   upon determining that the notification from the target site that the next cycle has completed:
      deleting, by the source site, snapshot N; and
      marking, by the target site, the cache data as high priority destage;
      wherein committing the transmitted to permanent storage includes committing, by the target site, the cache data to disk.

5. The method of claim 1, wherein the non-persistent storage device is a random access memory.

6. A system comprising:
   a memory comprising computer-executable instructions; and
   a processor operable by a storage system, the processor executing the computer-executable instructions, the computer-executable instructions when executed by the processor cause the processor to perform operations comprising:
      creating, at a source site of a data replication storage system, a snapshot (snapshot N) of input/output (IO) requests as part of a replication cycle;
      computing a delta of snapshot N and a previously created snapshot (snapshot N−1), the delta indicating a cycle N;
      transmitting, by the source site, the delta of snapshot N and the snapshot N−1 to a target site of the data replication storage system;
      storing, at the target site, snapshot N−1 during transmission of the delta, and caching the delta to a non-persistent storage device;
      upon determining an occurrence of a loss event at the target site, transmitting, by the target site to the source site, a request to retransmit the delta;
      upon receiving the request from the target site to retransmit the delta, retransmitting, by the source site, the delta to the target site;
      caching the delta to the non-persistent storage device until successful transmission of the delta;
      committing the transmitted delta to permanent storage;
      creating a next snapshot (snapshot N+1) for a next cycle (cycle N+1);
      computing a delta between the snapshot N and the snapshot N+1, the delta of snapshot N and snapshot N+1 indicating the cycle N+1; and
      transmitting the delta of snapshot N and snapshot N+1 to the target site;
      wherein committing the delta to the permanent storage device comprises:
         beginning transmission, by the source site, of cycle N+1 immediately after completing transmission of cycle N;
         retaining, at the source site, snapshot N;
         waiting, at the source site, for a notification from the target site that the next cycle N+1 is complete;
         upon determining no notification has been received, determining whether a loss event has occurred at the target site;
         if no loss event has occurred, waiting by the source site for the notification;

if a loss event has occurred, sending by the target site, a notification to the source site that a destage operation was unsuccessful;

retransmitting, by the source site to the target site upon receiving the notification, the delta of snapshot N and snapshot N+1; and storing, by the target site, the retransmitted delta of snapshot N and snapshot N+1 to the non-persistent storage device.

7. The system of claim 6, wherein committing the delta to the permanent storage device comprises:

waiting, at the source site, for confirmation from the target site that a destage operation of the transmitted delta has completed;

upon completion of the destage operation, transmitting by the target site to the source site, notification that the destage operation has completed; and upon receiving the notification of completed destage operation, beginning transmission of the next cycle (cycle N+1) by the source site to the target site.

8. The system of claim 7, wherein the operations further comprise marking, by the target site, the cache data as high priority destage, wherein committing the transmitted to permanent storage includes committing, by the target site, the cache data to disk.

9. The system of claim 6, wherein the operations further comprise:

upon determining that the notification from the target site that the next cycle has completed:

deleting, by the source site, snapshot N; and marking, by the target site, the cache data as high priority destage;

wherein committing the transmitted to permanent storage includes committing, by the target site, the cache data to disk.

10. The system of claim 6, wherein the non-persistent storage device is a random access memory.

11. A non-transitory computer readable medium comprising instructions that, when executed by a computer, causes the computer to perform operations comprising:

creating, at a source site of a data replication storage system, a snapshot (snapshot N) of input/output (IO) requests as part of a replication cycle;

computing a delta of snapshot N and a previously created snapshot (snapshot N−1), the delta indicating a cycle N;

transmitting, by the source site, the delta of snapshot N and snapshot N−1 to a target site of the data replication storage system;

storing, at the target site, snapshot N−1 during transmission of the delta, and caching the delta to a non-persistent storage device;

upon determining an occurrence of a loss event at the target site, transmitting, by the target site to the source site, a request to retransmit the delta;

upon receiving the request from the target site to retransmit the delta, retransmitting, by the source site, the delta to the target site;

caching the delta to the non-persistent storage device until successful transmission of the delta;

committing the transmitted delta to permanent storage;

creating a next snapshot (snapshot N+1) for a next cycle (cycle N+1);

computing a delta between the snapshot N and the snapshot N+1, the delta of snapshot N and snapshot N+1 indicating the cycle N+1; and transmitting the delta of snapshot N and snapshot N+1 to the target site;

wherein committing the delta to the permanent storage device comprises:

beginning transmission, by the source site, of cycle N+1 immediately after completing transmission of cycle N;

retaining, at the source site, snapshot N;

waiting, at the source site, for a notification from the target site that the next cycle N+1 is complete;

upon determining no notification has been received, determining whether a loss event has occurred at the target site;

if no loss event has occurred, waiting by the source site for the notification;

if a loss event has occurred, sending by the target site, a notification to the source site that a destage operation was unsuccessful;

retransmitting, by the source site to the target site upon receiving the notification, the delta of snapshot N and snapshot N+1; and storing, by the target site, the retransmitted delta of snapshot N and snapshot N+1 to the non-persistent storage device.

12. The non-transitory computer readable medium of claim 11, wherein committing the delta to the permanent storage device comprises:

waiting, at the source site, for confirmation from the target site that a destage operation of the transmitted delta has completed;

upon completion of the destage operation, transmitting by the target site to the source site, notification that the destage operation has completed; and upon receiving the notification of completed destage operation, beginning transmission of the next cycle (cycle N+1) by the source site to the target site.

13. The non-transitory computer readable medium of claim 12, wherein the operations further comprise marking, by the target site, the cache data as high priority destage, wherein committing the transmitted to permanent storage includes committing, by the target site, the cache data to disk.

14. The non-transitory computer readable medium of claim 11, wherein the operations further comprise:

upon determining that the notification from the target site that the next cycle has completed:

deleting, by the source site, snapshot N; and marking, by the target site, the cache data as high priority destage;

wherein committing the transmitted to permanent storage includes committing, by the target site, the cache data to disk.

* * * * *